(12) United States Patent
Lyu et al.

(10) Patent No.: US 12,041,638 B2
(45) Date of Patent: Jul. 16, 2024

(54) METHOD AND DEVICE FOR SIDELINK COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: QUECTEL WIRELESS SOLUTIONS CO., LTD., Shanghai (CN)

( * ) Notice: Subject to any disclaimer, the term of this patent is extended or adjusted under 35 U.S.C. 154(b) by 0 days.

(21) Appl. No.: 18/513,280

(22) Filed: Nov. 17, 2023

(65) Prior Publication Data

US 2024/0107561 A1   Mar. 28, 2024

Related U.S. Application Data (60) Division of application No. 18/333,330, filed on Jun. 12, 2023, which is a continuation of application No. PCT/CN2023/072863, filed on Jan. 18, 2023.

(30) Foreign Application Priority Data

Sep. 28, 2022   (CN) .......................... 202211193436.8

(51) Int. Cl.
*H04W 72/40* (2023.01)
*H04W 16/14* (2009.01)
(Continued)

(52) U.S. Cl.
CPC ........... *H04W 72/40* (2023.01); *H04W 16/14* (2013.01); *H04W 28/26* (2013.01); *H04W 72/044* (2013.01)

(58) Field of Classification Search
CPC ... H04W 72/044; H04W 28/26; H04W 72/20; H04W 72/40; H04W 16/14
See application file for complete search history.

(56) References Cited

U.S. PATENT DOCUMENTS

2022/0022216 A1* 1/2022 Li ....................... H04L 27/2602
2022/0053490 A1   2/2022 Zhang
(Continued)

FOREIGN PATENT DOCUMENTS

| CN | 113678392 | 11/2021 |
| CN | 114009070 | 2/2022 |

(Continued)

OTHER PUBLICATIONS

International Search Report in International Appln. No. PCT/CN2023/072863, mailed on Jun. 9, 2023, pages (with English machine translation).

(Continued)

*Primary Examiner* — Raj Jain
(74) *Attorney, Agent, or Firm* — Fish & Richardson P.C.

(57) ABSTRACT

The present disclosure provides a method and a device for sidelink communication. One example method includes: performing, by a terminal device, channel listening on a shared spectrum; and in response to a result of the channel listening being idle channels, transmitting, by the terminal device, a first sidelink channel by using a consecutive-slots transmission; wherein the consecutive-slots transmission comprises a transmission over a plurality of consecutive time slots, a first transmission block carried by the first sidelink channel includes transmission data corresponding to the plurality of consecutive time slots.

14 Claims, 4 Drawing Sheets

(51) Int. Cl.
*H04W 28/26* (2009.01)
*H04W 72/044* (2023.01)

(56) References Cited

U.S. PATENT DOCUMENTS

| | | | |
|---|---|---|---|
| 2022/0070921 A1* | 3/2022 | Xue | H04W 72/044 |
| 2022/0110107 A1* | 4/2022 | Kwak | H04W 72/20 |
| 2022/0159649 A1 | 5/2022 | Ko et al. | |
| 2022/0216956 A1 | 7/2022 | Yoshioka et al. | |
| 2022/0225295 A1 | 7/2022 | Sartori | |
| 2022/0264585 A1 | 8/2022 | Yang et al. | |
| 2022/0394761 A1* | 12/2022 | Liu | H04L 1/1854 |
| 2023/0087110 A1* | 3/2023 | Hu | H04W 28/26 |
| | | | 370/329 |
| 2023/0254821 A1* | 8/2023 | Fakoorian | H04L 1/0071 |
| | | | 370/329 |
| 2023/0269056 A1* | 8/2023 | Si | H04L 1/1812 |
| | | | 370/329 |

FOREIGN PATENT DOCUMENTS

| | | |
|---|---|---|
| CN | 115066031 | 9/2022 |
| CN | 115589596 | 1/2023 |
| WO | WO 2021232382 | 11/2021 |

OTHER PUBLICATIONS

Office Action in Chinese Appln. No. 202211193436.8, mailed on Apr. 27, 2024, 10 pages (with English translation).

CMCC, "Discussion on HARQ feedback for NR V2X," 3GPP TSG RAN WG1 #98 bis, R1-1910164, Chongqing, China, Oct. 14-20, 2019, 6 pages.

* cited by examiner

METHOD AND DEVICE FOR SIDELINK COMMUNICATION

CROSS-REFERENCE TO RELATED APPLICATIONS

This application is a divisional of U.S. patent application Ser. No. 18/333,330, filed on Jun. 12, 2023, which is a continuation of International Application No. PCT/CN2023/072863, filed on Jan. 18, 2023, which claims priority to Chinese Patent Application No. 202211193436.8, filed on Sep. 28, 2022. The disclosures of the aforementioned applications are hereby incorporated by reference in their entireties.

TECHNICAL FIELD

The present disclosure relates to the field of communication technology, and in particular to a method and a device for sidelink communication.

BACKGROUND

When conducting sidelink communication through shared spectrum, terminal devices perform channel access processes through mechanisms such as listen before talk (LBT) and the like. When a terminal device sends a physical sidelink feedback channel (PSFCH) but the channel access process fails, sending of the feedback information carried by the PSFCH may fail.

For a terminal device receiving the PSFCH, even if the feedback information is an acknowledgement (ACK), overhead for retransmission would occur because the terminal device cannot receive the feedback information, which affects the system transmission efficiency. Therefore, how to improve the channel access efficiency for PSFCH is an urgent problem to be solved.

SUMMARY

The present disclosure provides a method and a device for sidelink communication, which is conducive to improvement of channel access efficiency for PSFCHs.

Some embodiments of the present disclosure provide a method for sidelink communication. The method includes: a terminal device receives a first physical sidelink shared channel (PSSCH); the terminal device performs channel access on a shared spectrum, where the first PSSCH is associated with a plurality of PSFCH transmission resources on the shared spectrum, and the plurality of PSFCH transmission resources are determined based on reserved resources, dynamic resources, or the reserved resources and the dynamic resources on the shared spectrum; and the terminal device transmits a first PSFCH through one PSFCH transmission resource of the plurality of PSFCH transmission resources, where the first PSFCH carries feedback information associated with the first PSSCH.

Some embodiments of the present disclosure provide a method for sidelink communication. The method includes: a terminal device performs channel listening on a shared spectrum; and the terminal device transmits a first sidelink channel by consecutive-slots transmission in response to a result of the channel listening being idle channels. The consecutive-slots transmission corresponds to a plurality of consecutive time slots, a first transmission block carried by the first sidelink channel includes transmission data corresponding to the plurality of consecutive time slots, and the first sidelink channel includes at least one PSFCH.

Some embodiments of the present disclosure provide a device for sidelink communication, herein the device is a terminal device. The terminal device includes: a reception unit configured to receive a first PSSCH; an accessing unit configured to perform channel access on a shared spectrum, where the first PSSCH is associated with a plurality of PSFCH transmission resources on the shared spectrum, and the plurality of PSFCH transmission resources are determined based on reserved resources, dynamic resources, or the reserved resources and the dynamic resources on the shared spectrum; and a transmission unit configured to transmit a first PSFCH through one PSFCH transmission resource of the plurality of PSFCH transmission resources, where the first PSFCH carries feedback information associated with the first PSSCH.

Some embodiments of the present disclosure provide a device for sidelink communication, herein the device is a terminal device. The terminal device includes: a listening unit configured to perform channel listening on a shared spectrum; and a transmission unit configured to transmit a first sidelink channel by consecutive-slots transmission in response to a result of the channel listening being idle channels. The consecutive-slots transmission corresponds to a plurality of consecutive time slots, a first transmission block carried by the first sidelink channel includes transmission data corresponding to the plurality of consecutive time slots, and the first sidelink channel includes at least one PSFCH.

Some embodiments of the present disclosure provide a communication device including a memory and a processor. The memory is configured to store programs, which, when called and executed by the processor, cause the processor to implement operations of the method as illustrated above.

Some embodiments of the present disclosure provide a device including a processor. The processor is configured to call and execute programs stored in a memory, to implement operations of the method as illustrated above.

Some embodiments of the present disclosure provide a chip including a processor. The processor is configured to call and execute programs stored in a memory, to make a device including the chip to implement operations of the method as illustrated above.

Some embodiments of the present disclosure provide a non-transitory computer readable storage medium, configured to store programs, which, when called and executed, cause a computer to implement operations of the method as illustrated above.

Some embodiments of the present disclosure provide a computer program product including programs, which, when called and executed, cause a computer to implement operations of the method as illustrated above.

Some embodiments of the present disclosure provide a computer program. When the computer program is called and executed, causes a computer to implement operations of the method as illustrated above.

In the embodiments of the present disclosure, a PSSCH is associated with a plurality of PSFCH transmission resources, and the terminal device can transmit the PSFCH associated with the PSSCH using one PSFCH transmission resource of the plurality of PSFCH transmission resources. Therefore, even if a channel access process for the current transmission resource fails, the terminal device can select other PSFCH transmission resources to transmit PSFCHs. In this way, the channel access efficiency for PSFCHs can be improved, which is conducive to reduction of overhead and improvement of transmission efficiency.

DETAILED DESCRIPTION OF THE EMBODIMENTS

The following will describe the technical solutions in the present disclosure in conjunction with the accompanying drawings. For ease of understanding, the following will first introduce the terminologies and communication processes involved in the present disclosure in conjunction with FIGS. 1 to 4.

Figure 1:
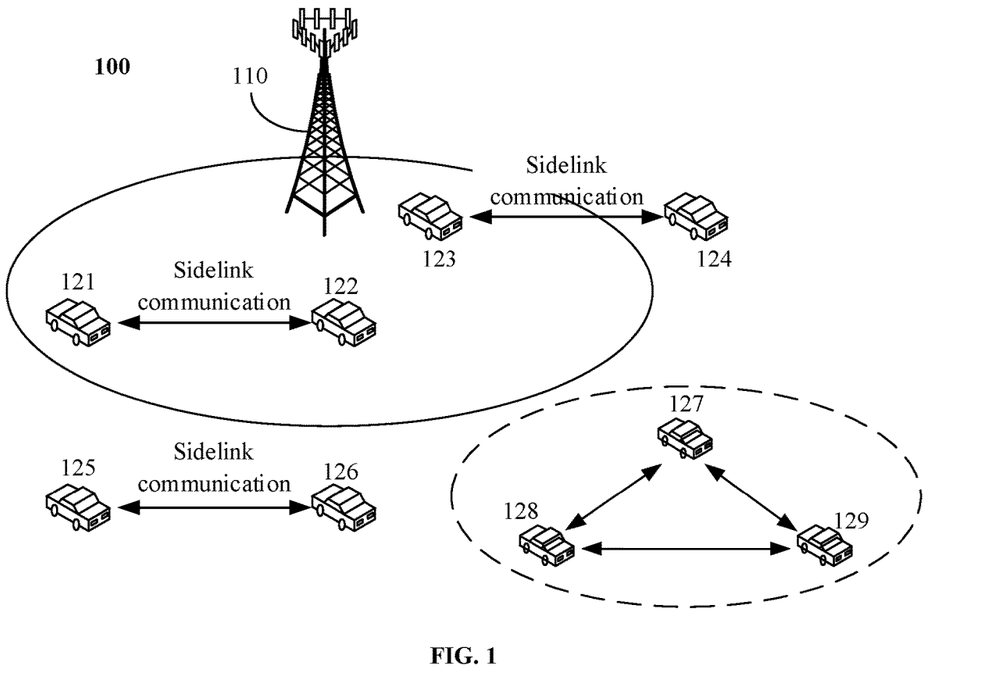
FIG. 1 shows a wireless communication system according to some embodiments of the present disclosure.
Figure 2:
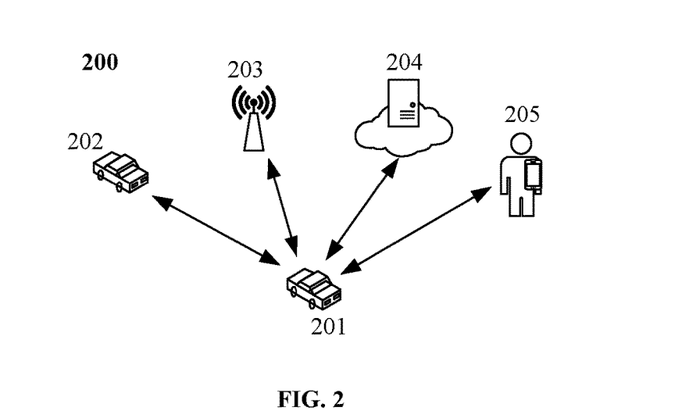
FIG. 2 is a schematic diagram of NR-V2X communication.

FIG. 1 is a systemic architecture diagram of a wireless communication system 100 according to some embodiments of the present disclosure. The wireless communication system 100 may include a network device 110 and terminal devices 121 to 129. The network device 110 may provide communication coverage for a specific geographical area and can communicate with terminals in the coverage area.

In some implementations, communication between terminal devices may be implemented through a sidelink (SL). Sidelink communication may also be referred to as proximity service (ProSe) communication, one-sided communication, side-link communication, device to device (D2D) communication, and side link communication.

In other words, the sidelink data is transmitted between terminal devices through a sidelink. The sidelink data may include data and/or control signaling. In some implementations, the sidelink data may be, for example, a physical sidelink control channel (PSCCH), a PSSCH, a PSCCH demodulation reference signal (DMRS), a PSSCH DMRS, a PSFCH, etc.

In the following, several common sidelink communication scenarios are described in conjunction with FIG. 1. In sidelink communication, there are three scenarios depending on whether the terminal devices using the sidelink are within the coverage range of network devices. Scenario 1, the terminal devices perform sidelink communication within the coverage range of the network devices. Scenario 2, some terminal devices perform sidelink communication within the coverage range of network devices. Scenario 3, the terminal devices perform sidelink communication outside the coverage range of the network devices.

As shown in FIG. 1, in Scenario 1, terminal devices 121 to 122 communicate through sidelink, and the terminal devices 121 to 122 are within the coverage range of a network device 110. In other words, terminal devices 121 to 122 are within the coverage range of a same network device 110. In this scenario, the network device 110 may send configuration signaling to the terminal devices 121 to 122, and accordingly, the terminal devices 121 to 122 communicate through sidelink based on the configuration signaling.

As shown in FIG. 1, in Scenario 2, terminal devices 123 to 124 communicate through sidelink, and the terminal device 123 is within the coverage range of the network device 110, but the terminal device 124 is outside the coverage range of the network device 110. In this case, the terminal device 123 receives configuration information from the network device 110 and communicates through the sidelink based on the configuration signaling. However, for the terminal device 124 located outside the coverage range of the network device 110, it cannot receive configuration information from the network device 110. In this case, the terminal device 124 may acquire the configuration of sidelink communication according to pre-configured configuration information and/or configuration information sent by the terminal device 123 within the coverage range, and communicate with the terminal device 123 through the sidelink based on the acquired configuration.

In some implementations, the terminal device 123 may send the above-mentioned configuration information to the terminal device 124 through a physical sidelink broadcast channel (PSBCH), in order to configure the terminal device 124 to communicate through the sidelink.

As shown in FIG. 1, in Scenario 3, terminal devices 125 to 129 are all outside the coverage range of the network device 110, and cannot communicate with the network device 110. In this case, the terminal devices perform sidelink communication based on pre-configured information.

It is noted that FIG. 1 exemplarily shows a network device and a plurality of terminal devices. Alternatively, the wireless communication system 100 may include a plurality of network devices and a coverage range of each network device may include other numbers of terminal devices. Embodiments of the present disclosure do not specifically limit this.

In some implementations, the wireless communication system 100 may further include other network entities such as network controllers, mobile management entities or the like. Embodiments of the present disclosure do not specifically limit this.

It should be understood that the technical solutions of the embodiments of the present disclosure may be applied to various communication systems, such as fifth generation (5G) systems or new radio (NR) systems, long term evolution (LTE) systems, LTE frequency division duplex (FDD) systems, LTE time division duplex (TDD) systems and the like. The technical solutions provided by the present disclosure may also be applied to future communication systems, such as sixth generation mobile communication systems, satellite communication systems, and the like.

The terminal device in the embodiments of the present disclosure may also be referred to as a user equipment (UE), an access terminal, a user unit, a user station, a mobile radio station, a mobile station (MS), a mobile terminal (MT), a remote station, a remote terminal, a mobile device, a user terminal, a wireless communication device, a user proxy or a user device. The terminal device in the embodiments of the present disclosure may refer to a device that provides voice and/or data connectivity to the user, and may be used to connect people, objects, and machines, such as handheld devices with wireless connection functions, vehicle-mounted devices, etc. The terminal device in the embodiments of the present disclosure may be a mobile phone, a tablet PC, a laptop, a personal digital assistant, a mobile internet device (MID), a wearable device, a vehicle, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home and the like. Alternatively, the terminal device may be used as a base station. For example, the terminal device may serve as a scheduling entity that provide sidelink signals between terminal devices in vehicle to everything (V2X) or D2D, etc. For example, a cellular phone and a vehicle communicate with each other using sidelink data. A cellular phone and a smart home device communicate with each other without needing of relay communication signals by base stations.

The network device in the embodiments of the present disclosure may be a device configured for communicating with terminal devices, and the network device may also be referred to as an access network device or a wireless access network device, such as a base station. The network device in the embodiments of the present disclosure may refer to a radio access network (RAN) node (or device) that accesses a terminal device to the wireless network. A base station may broadly cover various names in the following, or be replaced with names such as NodeB, evolved NodeB (eNB), next generation NodeB (gNB), relay station, transmitting and receiving point (TRP), transmitting point (TP), access point (AP), main station MeNB, secondary station SeNB, multi standard wireless (MSR) node, home base station, network controller, access node, wireless node, transmission node, transceiver node, base band unit (BBU), remote radio unit (RRU), active antenna unit (AAU), remote radio head (RRH), central unit (CU), distributed unit (DU), positioning node, etc. A base station may be a macro base station, a micro base station, a relay node, a donor node or the like, or a combination thereof. A base station may also refer to a communication module, a modem, or a chip installed in the aforementioned equipment or devices. A base stations may also be a mobile switching center and a device playing a role of a base station in D2D, V2X, or machine to machine (M2M) communication, a network-end device in 6G network, and a device playing a role of a base station in future communication systems. The base station can support networks with the same or different access technologies. The embodiments of the present disclosure do not limit the specific technology and device form of the network device.

The base station may be fixed or mobile. For example, helicopters or drones may be configured to act as mobile base stations, and one or more cells may move depending on the location of a mobile base station. In other examples, helicopters or drones may be configured as devices to communicate with another base station.

In some deployments, the network device in the embodiments of the present disclosure may refer to CU or DU, or the network device includes CU and DU. A gNB may also include AAU.

Network devices and terminal devices may be deployed on land, including indoor or outdoor, handheld or vehicle-mounted, or may be deployed on water, or may be deployed on airplanes, balloons, and satellites in the air. The embodiments of the present disclosure do not limit on the scenarios in which the network devices and the terminal devices are located.

It should be understood that all or part of the functions of the communication devices in the present disclosure may also be achieved through software functions running on hardware, or through virtualization functions instantiated on platforms such as cloud platforms.

Communication Modes of Sidelink

With the development of sidelink communication technology, it involves the information exchanges among various terminal devices. Taking the V2X communication system 200 shown in FIG. 2 as an example, the vehicle-to-vehicle (V2V) communication between a terminal device 201 and a terminal device 202 involves information exchange between vehicles. The vehicle-to-infrastructure (V2I) communication, vehicle-to-network (V2N) communication, and vehicle-to-pedestrian (V2P) communication between the terminal device 201 and the terminal devices 203 to 205 involve information exchanges between a vehicle and an external system.

The gradual expansion of information exchange scope has put forward higher requirements for communication systems. Taking the development of V2X as an example, in LTE-V2X, only broadcast mode is supported for sidelink communication between terminal devices. In NR-V2X, three communication modes can be supported: broadcast, groupcast, and unicast.

Broadcast is the most basic communication mode in sidelink communication. In the transmission mode of broadcast, the terminal device receiving sidelink data may be any terminal device surrounding the terminal device functioning as a transmitter. For example, referring to FIG. 1, assuming that a terminal device 125 is the transmitter and sends sidelink data by broadcasting, then any of the terminal devices 121 to 124 and 126 to 129 located around the terminal device 125 may serves as a receiver for the sidelink data.

Groupcast communication is used to support information exchanges between terminal devices in a specific group (or communication group), in order to assist in the negotiation and decision-making of terminal devices in the group. The communication group using groupcast communication may be a managed group having stable connection relationships, or a temporary group composed in a connectionless way.

In groupcast transmission, the terminal devices that receive sidelink data may be all terminal devices in a communication group. Alternatively, the terminal devices that receive the sidelink data may be all terminal devices within a certain transmission range. For example, referring to FIG. 1, for a communication group including terminal devices 127 to 129, when terminal device 127 transmits sidelink data in the groupcast manner, other terminal devices 128 to 129 in the communication group are receiving terminals that receive the sidelink data. For example, referring to FIG. 1, assuming that the terminal devices within a preset range include terminal devices 127 to 129, when terminal device 127 sends sidelink data in the groupcast manner, other terminal devices 128 to 129 within the preset range are receiving terminals that receive the sidelink data.

Unicast communication can achieve sidelink communication between two terminal devices. Taking NR-V2X as an example, wireless resource control (RRC) signaling based on PC5 interface can achieve reliable communication from one terminal device to another terminal device.

In unicast transmission mode, there is usually only one terminal device that receives sidelink data. As shown in FIG. 1, communication between the terminal device 121 and the terminal device 122 may be implemented through unicast transmission. For example, when the terminal device 121 communicates with the terminal device 122 using sidelink, the terminal device 122, as the only receiving device, receives sidelink data. The sidelink data may include PSSCH and PSCCH. The terminal device 122 may obtain sidelink control information (SCI) associated with sidelink transmission and scheduling by demodulation, and the SCI may help the terminal device 122 to receive and decode sidelink information.

In some communication systems, the sidelink supports a hybrid automatic repeat request (HARQ) mechanism through ACK/negative acknowledgement (NACK). The sidelink HARQ feedback is sent by the receiving terminal device to the sending terminal device on the PSFCH.

In sidelink communication, terminal devices may also be devices that meet the provisions of different protocols and include LTE SL modules and/or NR SL modules. The different protocols may be protocols that have been or are planned to be released under the third generation partnership project (3GPP) including Rel-16, Rel-17, Rel-18, or the like. Specifically, these terminal devices mainly include the following five types:

Devices of class A: Rel-18 devices that include LTE SL modules and NR SL modules.

Devices of class B: Rel-18 devices that only include NR SL modules.

Devices of class C: Rel-14/Rel-15 devices that only include LTE SL modules.

Devices of class D: Rel-16/Rel-17 devices that only include NR SL modules.

Devices of class E: Rel-16 devices that include LTE SL modules and NR SL modules.

Resource Allocation Method of Sidelink

In some communication systems (such as NR), two resource allocation methods for sidelink resources are defined, including mode 1 and mode 2.

In mode 1, network devices schedule sidelink resources for terminal devices.

Currently, mode 1 includes two methods: dynamic resource configuration and sidelink configuration authorization. For dynamic resource configuration, network devices may allocate sidelink transmission resources to terminal devices by sending downlink control information (DCI). The DCI corresponds to the physical downlink control channel (PDCCH). For the sidelink configuration authorization, when a terminal device is configured with sidelink resources, and the terminal device has data to be sent, the terminal device may use the configured sidelink resources to transmit data without need of reapplying for sidelink resources from a network device. For periodic services, network devices typically allocate semi-static transmission resources to terminal devices. By scheduling, by the network devices, the transmission resources for the terminal devices on direct links, resource conflicts can be effectively prevented, and the problem of hidden nodes can be addressed.

For example, referring to FIG. 1, terminal devices 121 to 123 are located in the coverage range of the network device 110, and the network device 110 may allocate sidelink resources for the terminal devices 121 to 123.

In mode 2, terminal devices independently select sidelink resources from a sidelink resource pool.

The sidelink resource pool may be configured by network devices or pre-configured. In some embodiments, network devices may configure a sidelink resource pool to terminal devices through high-level signaling. Terminal devices select, by resource listening or random selection, time-frequency resources from the resource pool which is configured by the network devices or pre-configured. For example, terminal devices 124 to 129 in FIG. 1 are located outside the coverage range of the network device 110, and terminal devices 124 to 129 may independently select sidelink resources from the resource pool configured by the network device.

In this mode, the terminal devices may also reserve, based on scheduling instructions from SCI or resource awareness, resources for blind transmission (or retransmission) of transport blocks (TB) or transmission (or retransmission) based on HARQ feedback. For example, the SCI-1 transmitted by a terminal device on PSCCH indicates the time-frequency resources reserved by the terminal device, and the awareness terminal device excludes the resources indicated in SCI, thereby reducing the probability of resource conflicts.

The processes executed by terminal devices include a resource awareness process and/or a resource selection process. Terminal devices which are in the awareness window may be aware of the resources in the selection window, thereby selecting or excluding candidate resources in the selection window. During the awareness process, terminal devices may also determine the occupancy or interference of sidelink resources by measuring the value of reference signal receiving power (RSRP) of the resources in the awareness window.

For periodic services, sidelinks can reserve (or put on reserve) sidelink communication resources for terminal devices at the expected time of arrival of data to prevent resource competition with other terminal devices. For example, the transmission resources (transmission timing) of PSFCH may periodically appear in the time domain in the resource pool and have a configured/pre-configured period.

System Frame Structure of Sidelink

Figure 3:
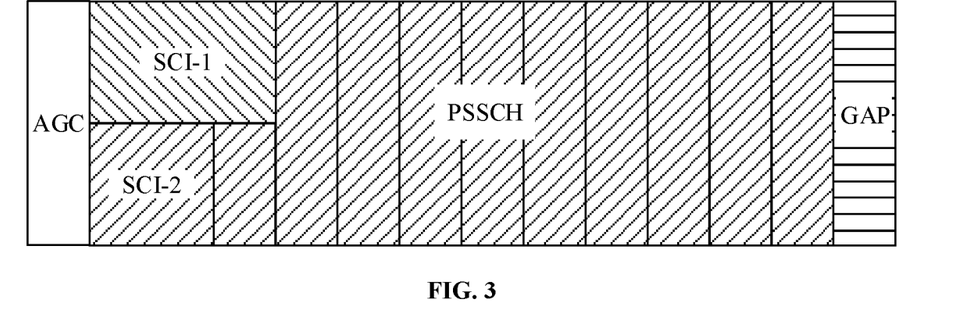
FIG. 3 is a structural diagram of a frame without carrying a PSFCH.

The frame structure (time slot structure) of the system frame for sidelink according to the embodiments of the present disclosure is illustrated in conjunction with FIGS. 3 and 4 below. The system frame is a single time slot including 14 time domain symbols. The system frame includes two structures: with feedback and without feedback. The feedback is carried by the PSFCH as illustrated above. FIG. 3 shows the frame structure of a system frame without carrying PSFCH, and FIG. 4 shows the frame structure of a system frame carrying PSFCH.

Figure 4:
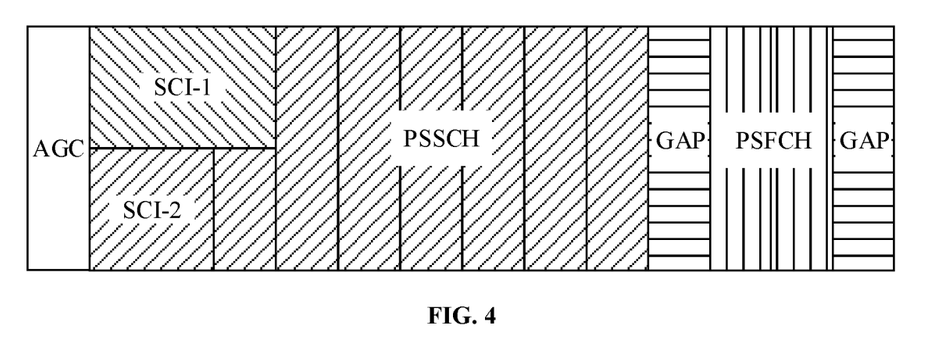
FIG. 4 is a structural diagram of a frame carrying a PSFCH.

The SCI in FIGS. 3 and 4 includes two parts, namely the first-stage SCI (SCI-1) and the second-stage SCI (SCI-2). The first-stage SCI-1 is transmitted on PSCCH, and the second-stage SCI-2 is transmitted on PSSCH.

Referring to FIG. 3, in the time domain, the sidelink symbols occupied by SCI-1 transmitted on PSCCH start from the second sidelink symbol of the system frame (for example, orthogonal frequency division multiplexing (OFDM) symbol) and include 2 or 3 sidelink symbols. Transmitting PSCCH at the beginning of the time slot facilitates the receiving terminal device to start demodulating PSCCH as soon as possible, and earlier obtaining of PSCCH by the terminal device can reduce power consumption of the terminal device.

In the frequency domain, PSCCH may occupy a plurality of physical resource blocks (PRBs). Generally, in order to reduce the complexity of blind detection of PSCCH by terminal devices, a number of PSCCH symbols and a number of PRBs in a resource pool are configured as a respective fixed value.

Referring to FIG. 3, in the time domain, SCI-2 transmitted on PSSCH also starts from the second sidelink symbol of the system frame and ends at the penultimate sidelink symbol of the system frame. In the frequency domain, PSSCH occupies a plurality of sub-channels for the system frame. In the resource pool of the sidelink, a sub-channel is the minimum granularity for allocation of PSSCH frequency domain resource. The resource pool may include a plurality of sub-channels each consisting of $n_{subCHsize}$ PRBs, herein $n_{subCHsize}$ values of 10, 12, 15, 20, 25, 50, 75, or 100.

Therefore, PSCCH and a portion of PSSCH with which the PSCCH is associated are transmitted on resources that overlap in time but do not overlap in frequency, and the PSCCH and the other portion of PSSCH are transmitted on resources that do not overlap in time.

Generally, the first sidelink symbol in a time slot is a repetition of the second sidelink symbol. When a terminal device receives the system frame, the first sidelink symbol may be used as an automatic gain control (AGC) symbol. The data on the AGC symbol is usually not used for data demodulation. The last symbol in a time slot is a GAP symbol playing a role of protection gap.

Referring to FIG. 4, when a PSFCH is carried in a time slot, the last second sidelink symbol and the last third sidelink symbol in the system frame are used for PSFCH transmission. Moreover, a GAP symbol should be reserved after either PSSCH or PSFCH. The value of pre-configuration cycle for PSFCH resources may be {1, 2, 4} time slots.

With the configuration of SCI, the multiplexing scheduling for a plurality of services in a single time slot can be supported.

Communication Spectrum of Sidelink

The spectrums used by communication systems include licensed spectrums and unlicensed spectrums. An important aspect of extension of communication systems to different fields is the use of unlicensed spectrums. For example, NR deployed on unlicensed spectrums is referred to as NR-U.

At present, sidelinks mainly use licensed spectrums. The sidelinks may also use unlicensed spectrums. The sidelinks deployed on unlicensed spectrums may be referred to as SL-U.

Compared with licensed spectrums, unlicensed spectrums have the characteristic of sharing without permission, thus unlicensed spectrums are also known as shared spectrum. For operators, spectrum sharing facilitates to aggregate spectrums at appropriate time to dynamically support high-bandwidth services. Spectrum sharing can also extend the advantages of communication technology (such as NR) to operational entities that may not be able to obtain licensed spectrums.

Sharing spectrum is required to consider the coexistence of different radio access technology (RAT) systems, such as wireless fidelity (WiFi) systems, LTE based license assisted access (LAA) systems, and the like. Different systems use frequency bands in unlicensed spectrums in a competitive way and based on the principles of channel access fairness and coexistence of multiple RATs.

In a shared spectrum, any RAT system must communicate within the limitations of unlicensed spectrum supervision rules. The supervision rules include power and power spectral density level, maximum channel occupancy time (COT), bandwidths occupied by channels, channel listening mechanism, etc. In a same frequency band, each system must meet the requirements of the supervision rules, and occupy and release channels reasonably, to prevent interference with other RAT systems in the same frequency band.

For the use of shared spectrums, a RAT system may use mandatory channel listening techniques (such as LBT) to access the network. That is to say, data transmission is carried out only when it is listened that the current channel is not occupied. Thus, some data cannot be guaranteed to be sent on predetermined channels.

When performing sidelink communication on a sharing spectrum, the terminal device may perform channel access on idle resources after detecting that there are idle channels using channel listening mechanisms such as LBT, and sends data based on the above supervision rules. For example, when the terminal device transmits data on channel resources, the limitations of COT should be met. That is to say, a continuous data transmission should be limited to the COT time, beyond which the terminal device should release the channels and perform LBT again.

When performing channel access on sharing spectrum, in response to the channel access process failing (such as LBT failure), the transmission of the terminal device may be interrupted.

For highly important transmissions, the failure of the channel access process may result in the loss of important transmission information. The highly important transmission is for example the transmission of PSFCH. PSFCH is used to carry HARQ feedback for PSSCH. The lack of HARQ feedback may bring a significant impact on performance. Therefore, in resource allocation mode 2, for PSFCH, LBT of type 1 is generally used as the baseline channel access, with a channel access priority class (CAPC) value p=1. The p valued with 1 indicates that PSFCH has a relatively high channel access priority class. According to all applicable restrictions, PSFCH may also use LBT of type 2 for channel access in the case of COT sharing.

As mentioned above, the transmission opportunity (TO) of PSFCH may periodically appear in the time domain in the resource pool. The transmission opportunity of PSFCH may be one or more RBs in the set of available resource blocks (RBs). PSSCH is transmitted using sub-channels and time slots in the time domain in the resource pool. By mapping PSSCH transmission resources to the one or more RBs, PSFCH transmission may be implemented. In associated sidelinks, the timeline for PSFCH to provide HARQ feedback only has one opportunity for PSFCH transmission. That is to say, a PSSCH transmission is only associated with a single transmission opportunity of PSFCH. Therefore, before the terminal device sends feedback corresponding to PSSCH, the channel access process should be performed before the PSFCH transmission opportunity associated with the PSSCH.

As mentioned above, there is uncertainty in channel access mechanisms such as LBT. When the channel access process for PSFCH performed before the transmission opportunity fails, the HARQ feedback associated with PSSCH (such as HARQ-ACK feedback) cannot be transmitted and will be discarded. The lack of HARQ feedback from PSSCH may bring a significant impact on performance.

Taking a unicast link as an example, the terminal device serving as a transmitter sends PSSCH, and the terminal device serving as a receiver receives and provides feedback on the reception situation. When the LBT performed by the receiving terminal device before sending PSFCH fails, the transmitting terminal device regards the lost PSFCH signal as NACK. That is to say, when the feedback carried by PSFCH is HARQ-NACK, regardless of whether the PSSCH is lost or not, the transmitting terminal device performs a retransmission of PSSCH. When the feedback carried by PSFCH is ACK, the transmitting terminal device still has to retransmit the PSSCH due to lack of reception of the feedback information. The retransmission of PSSCH brings certain overhead, thereby affecting transmission performance and transmission efficiency. Moreover, for the receiving terminal device, after receiving PSSCH, the terminal device decodes first and provide feedback based on the decoding result. When the feedback information is discarded, the decoding by the terminal device becomes unnecessary overhead, thereby further affecting system performance and transmission efficiency.

Therefore, due to the uncertainty of channel access on shared spectrums, when a PSSCH transmission is only associated with one PSFCH transmission opportunity, the channel access efficiency for PSFCH is low, thereby further affecting system performance and transmission efficiency.

In view of this, some embodiments of the present disclosure provide a method for sidelink communication. In the method, a PSSCH is associated with a plurality of PSFCH transmission resources, and a terminal device can flexibly select one PSFCH transmission resource of the plurality of PSFCH transmission resources to transmit the PSFCH. In this way, the certainty of channel access for PSFCH can be improved. The method for sidelink communication according to some embodiments of the present disclosure is illustrated below, in conjunction with FIG. 5.

Figure 5:
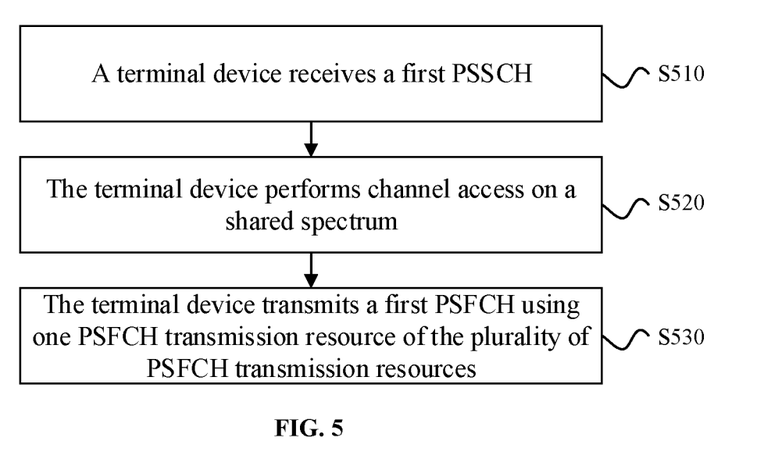
FIG. 5 is a flow chart of a method for sidelink communication according to some embodiments of the present disclosure.

Referring to FIG. 5, at S510, a terminal device receives a first PSSCH.

The terminal device may be a device for sidelink communication. For example, the terminal device may be a device of Class A, a device of Class B, or a device of other three types as illustrated above. In some embodiments, the terminal device may function as a receiver in the sidelink for receiving data transmitted by other terminal devices. In some embodiments, the terminal device may function as a transmitter in the sidelink for transmitting data and feedback information to other terminal devices.

The terminal device may receive the first PSSCH using a plurality of communication modes. In some embodiments, the terminal device may be a receiving device in unicast communication. In some embodiments, the terminal device may be a group member of a broadcast communication group or a communication group, and receive the first PSSCH sent by the group header terminal or other group members. For example, the terminal device may be a vehicle that receives the first PSSCH sent by other vehicles in the communication group.

In some embodiments, the terminal device receiving the first PSSCH may be located within or outside the coverage range of network. For example, the terminal device located within the coverage range of network can receive the first PSSCH sent by a network device.

The first PSSCH may be a sidelink including SCI-2. The terminal device may demodulate the first PSSCH based on SCI-2 to receive transmission data carried by the first PSSCH, such as transmission blocks.

The transmission of the first PSSCH may be transmission based on continuous RBs, interleaved RBs, or interlaced RBs. In some embodiments, for PSSCH transmission, one sub-channel may be deemed as a interlaces, herein a may be valued with 1 or other fixed values. In some embodiments, the sub-channels used for transmitting PSSCH may be limited to one RB set or be included by one or more RB sets in the resource pool.

The first PSSCH may be a data channel having a specific HARQ timeline or a data channel having different HARQ timelines.

At S520, the terminal device performs channel access on a shared spectrum.

The channel access may be the initial access for data transmission by the terminal device. In some embodiments, the channel access may only include the initial access performed by the terminal device. For example, the channel access may be resource awareness access. In some embodiments, the channel access may include channel listening and initial access performed by the terminal device.

On the shared spectrum, the first PSSCH in S510 may be associated with a plurality of PSFCH transmission resources. A PSFCH transmission resource may be one or more RBs. In the time domain, the PSFCH transmission resources may also be referred to as PSFCH transmission opportunities.

In some embodiments, the requirements of different transmission modes for the PSFCH transmission resources may be met by mapping the first PSSCH to a plurality of PSFCH transmission resources. For example, for consecutive-slots transmission, some time slots in the system frame structure may not be used to transmit PSFCH. The flexible mapping to PSFCH transmission resources can improve transmission efficiency.

The plurality of PSFCH transmission resources may be continuous or discontinuous time-frequency resources. In some embodiments, the plurality of PSFCH transmission resources may be a plurality of consecutive RBs in the resource pool. In some embodiments, the plurality of PSFCH transmission resources may be allocated in an interleaved and interlaced way. The interleaved waveform may be associated with the number of RBs required for each PSFCH. In some embodiments, each PSFCH transmission resource may occur on consecutive resources in a same time slot.

The plurality of PSFCH transmission resources may be determined based on a plurality of types of resources, which will be described in detail in the following.

The plurality of PSFCH transmission resources may be indicated by SCI or other dedicated signaling. In some embodiments, SCI may indicate the time slot length (number of time slots) of the plurality of PSFCH transmission resources. In some embodiments, the number of the PSFCH transmission resources may also be indicated by SCI configuration signaling or other dedicated signaling.

At S530, the terminal device transmits a first PSFCH using one PSFCH transmission resource of the plurality of PSFCH transmission resources.

The first PSFCH may carry feedback information associated with the first PSSCH, and the feedback information may be ACK or NACK in HARQ feedback.

In some embodiments, the feedback information may be determined based on the reception of the first PSSCH by the terminal device. For example, in harsh transmission environments, the first PSSCH received by the terminal device experiences packet loss, and the feedback information is NACK. In some embodiments, the feedback information may be determined based on the decoding of the first PSSCH by the terminal device. For example, after decoding the first PSSCH, the terminal device determines that the transmission of the first PSSCH succeeds, and the feedback information is ACK.

The transmission of the first PSFCH may be either the initial transmission of the feedback information or the retransmission of the feedback information.

The first PSFCH may be transmitted through time-frequency resources of the plurality of PSFCH transmission resources. In some embodiments, the first PSFCH may be transmitted through one PSFCH transmission resource. In some embodiments, the first PSFCH may be transmitted through a plurality of PSFCH transmission resources. For example, when the first PSSCH is associated with t transmission resources, the first PSFCH may be transmitted through less than t transmission resources or t transmission resources. The PSFCH transmission resources may be interlaced and interleaved.

In some embodiments, the first PSFCH may be flexibly transmitted based on the plurality of PSFCH transmission resources. For example, the terminal device may select any one of the plurality of PSFCH transmission resources according to successful channel access process. For example, when the channel access process for PSFCH before a transmission resource fails, the terminal device may select a later transmission resource for transmission. The later transmission resource may be occupied by a next cycle or a next channel to ensure the transmission of HARQ feedback.

According to FIG. 5, in the method for sidelink communication provided by the embodiments of the present disclosure, the PSSCH is associated with a plurality of PSFCH transmission resources. With this flexible association manner, the channel access efficiency for PSFCH can be improved. Furthermore, this flexible association manner can serve as a compensation mechanism for failed channel access for PSFCH. In this way, additional transmission on more transmission resources can be allowed, thereby ensuring the transmission of PSFCH by the terminal device on the shared spectrum.

As mentioned above, the plurality of PSFCH transmission resources may be determined based on a plurality of types of resources.

In some embodiments, the plurality of PSFCH transmission resources may be determined based on reserved resources on the shared spectrum. The reserved resources can provide a plurality of PSFCH transmission resources to ensure the transmission requirements of PSFCH. As an example, the reserved resources may be time-frequency resources in the resource pool configured by network devices for the terminal device, or time-frequency resources in a pre-configured resource pool. As another example, the reserved resources may be time-frequency resources of reserved resources that are determined by resource awareness and are used for periodic transmission. As still another example, the reserved resources may be time-frequency resources in COT sharing.

In some embodiments, the plurality of PSFCH transmission resources may be determined based on dynamic resources on the shared spectrum. The dynamic resources may be a portion of common resources reserved in the resource pool for dynamic scheduling. The dynamic resources may also be time-frequency resources that are not reserved or used in the resource allocation mode 2.

When the reserved PSFCH transmission resources are fully occupied, the transmission resources may be determined through dynamic scheduling. For example, the dynamic scheduling can occupy other resources in the pre-configured resource pool for PSFCH transmission. Alternatively, the dynamic scheduling can schedule resources in other resource pools (non-pre-configured resource pools) for PSFCH transmission.

In some embodiments, using the reserved resources or the dynamic resources (common resources) may be determined based on the types of services. For example, different types of services may have different priorities. A service having a high priority may use the reserved resources, and a service having a low priority may use the dynamic resources. Alternatively, services may be classified according to quality of service (QoS) to determine the services using the reserved resources and the services using the dynamic resources. In some other embodiments, using the reserved resources or the dynamic resources may be determined based on the arrival order of the services and waiting time. For example, a principle that first arrive, first allocated may be used.

In some embodiments, the terminal device may indicate, using SCI, the plurality of transmission resources of the reserved resources for transmitting PSFCH. As an example, the reserved resources may be associated with the first indication information. The first indication information may be carried in first SCI. For example, the first indication information may be carried in SCI-1 of the first SCI or in SCI-2.

In some embodiments, the first indication information may be determined based on one or more types of information.

In some embodiments, the first indication information may be determined based on a maximum number of resource blocks (RB s) required by each PSFCH transmission resource of the plurality of PSFCH transmission resources. A number of resource blocks may be determined by equal division according to the total number of the reserved resources, or by specific division according to requirements of services. For example, the maximum number of RBs required by each PSFCH transmission resource may be k, where k is an integer greater than or equal to 1. When using TO to represent each PSFCH transmission resource, the j-th TO of the plurality of TOs may be represented as $[RB_{j0}, RB_{j0+k-1}]$.

In some embodiments, the first indication information may be determined based on a number of first sidelink time-domain units in the reserved resources. The first sidelink time-domain units may be time slots. For example, when the reserved resources include n time slots in total, the first indication information may indicate the plurality of PSFCH transmission resources based on the n time slots.

In some embodiments, the first indication information may be determined based on a number of resource blocks configured for PSFCH transmission in a first sidelink time-domain unit. For example, when the first sidelink time-domain unit is a time slot, the number of resource blocks may be a total number of RBs in a time slot of the reserved resources.

In some embodiments, the first indication information may be determined based on a number of PSFCH transmission resources in a first sidelink time-domain unit. For example, when a time slot has $M_s$ PSFCH transmission resources, the first indication information may be used to indicate the $M_s$ PSFCH transmission resources, respectively.

In some embodiments, the first indication information may be determined based on a service type corresponding to the first PSSCH. The service type may also be a service priority. For example, when the first PSSCH carries a real-time service with relatively high priority, the first indication information may indicate that the first PSSCH is associated with a plurality of PSFCH transmission resources that are close to the first PSSCH in time. For example, when the first PSSCH carries a periodic service, the first indication information may periodically configure a plurality of PSFCH transmission resources associated with the first PSSCH.

In some embodiments, the first indication information may be determined based on more than one type of the information as illustrated above. The first indication information may indicate the index of each transmission resource. For example, the reserved resources include M PSFCH transmission resources, and first indication information corresponding to a j-th PSFCH transmission resource of the M PSFCH transmission resources may be represented as IndexTO, where the IndexTO may meet:

$$\text{IndexTO} = j \times \lfloor n \times m / M_s \rfloor.$$

Where j is an integer with a value range from 0 to M−1, n represents the number of the first sidelink time-domain units in the reserved resources, m represents the number of the resource blocks configured for PSFCH transmission in a first sidelink time-domain unit, and MS represents the number of PSFCH transmission resources in a first sidelink time-domain unit.

In some embodiments, reserving transmission resources for PSFCH can meet the transmission requirements of PSFCH in consecutive-slots transmission. By SCI configurations or DCI scheduling, a large transmission block may be formed during the transmission of a plurality of consecutive time slots. Assuming that each time slot carries a NACK/ACK, each transmission block requires a plurality of PSFCH transmission resources. That is to say, there will be a plurality of HARQ codebooks in a transmission block, and transmitting a large number of transmission blocks per unit time requires a large amount of feedback. The capabilities of the terminal device will be greatly challenged. Therefore, by reserving resources, the PSFCHs corresponding to PSSCH transmission can be mapped to a set of PSFCH resources. The reserved resources may be, for example, a set of all RBs in a same time slot, and the RBs may require interlaced transmission. By providing a dedicated set of PSFCH resources for consecutive-slots transmission, the reserved resources can ensure that the ACK/NACK feedback of each time slot in a complete transmission block has PSFCH resources for transmission.

In some embodiments, after the terminal device performs channel access on the shared spectrum, the terminal device may determine first whether there are idle PSFCH transmission resources in the reserved resources. For example, the terminal device may determine according to the first indication information.

As an example, after the access succeeds using LBT, when it is found that there are still reserved PSFCH transmission resources, the terminal device may select one PSFCH transmission resource of the PSFCH transmission resources to send the first PSFCH. When the plurality of PSFCH transmission resources have been fully occupied, the terminal device may use dynamic resource allocation. That is to say, when there are no idle PSFCH transmission resources in the reserved resources, the terminal device may transmit the first PSFCH using the dynamic resources as mentioned hereinbefore.

In some embodiments, the terminal device may determine whether to transmit the first PSFCH based on the feedback information. For example, the terminal device may set a first threshold (threshold value) for the number of NACK feedback. When the number of NACK feedback from the terminal device is greater than the first threshold, the terminal device may terminate transmission of the first PSFCH.

As an example, the transmission of the first PSFCH may be terminated by adding an indication of disabling HARQ to the SCI indication. Furthermore, the indication of disabling/enabling HARQ may be set through SCI. For example, based on the QoS requirements of different services, it may be set whether HARQ is disabled for the services. For the services requiring high QoS, HARQ may be enabled. For the services requiring low QoS, HARQ may be disabled.

As another example, when the terminal device is in a harsh environment, NACK is continuously sent. It is necessary for the terminal device to continuously perform LBT in order to send PSFCH, which may cause resource conflicts with other terminal devices. Therefore, a maximum number of NACK transmission may be set. When exceeding the number, HARQ would be disabled through SCI in a next TB transmission.

In some embodiments, the terminal device performs channel listening before performing channel access on the shared spectrum. On the shared spectrum, the terminal device typically starts performing resource selection and channel access only after the channel listening succeeds. The terminal device may determine whether to send the first PSFCH using short control signaling transmission (SCSt) based on a result of channel listening. When the result of channel listening is that the channels are always occupied, that is to say, the channel access continues to fail, the terminal device cannot send PSFCH. As a possible implementation, the terminal device may set a second threshold for channel listening failure. For example, when a number of channel listening failures exceeds the second threshold, the terminal device may transmit the first PSFCH using SCSt.

It should be noted that in the shared spectrum, LBT is not needed before SCSt. There are two limitations on using SCSt: within a 50 ms observation period, a number of short control signaling transmissions of the terminal device should be equal to or less than 50; and during the observation period, the total duration of the short control signaling transmissions of the terminal device should be less than 2500 μs. If the short control signaling exceeds these two limitations, channel access may be performed using LBT.

In some embodiments, the second threshold may be set based on the services. For example, the second threshold for all services may be set to be the same. For example, the second threshold may be associated with the QoS of the services.

By reserving a plurality of PSFCH transmission resources, the channel access efficiency for PSFCH can be improved, thereby compensating for the overhead and efficiency issues caused by uncertain channel access for PSFCH. Flexible mapping of PSFCH transmission resources can also meet the requirements of different transmission modes such as consecutive-slots transmission.

In consecutive-slots transmission, in order to maximize the utilization of cleared LBT attempts, the terminal device may utilize a plurality of continuous time slots for transmission of data of large size. That is to say, with a successful LBT, a plurality of pieces of data (a plurality of transmission blocks) may be sent. Therefore, for the same transmission data, using consecutive-slots transmission can prevent LBT from being repetitively performed for a plurality of independent time slots, thereby improving channel access efficiency. The plurality of independent time slots may also be a plurality of transmission blocks.

As mentioned above, if each time slot of the plurality of consecutive time slots carries a NACK/ACK, the consecutive-slots transmission requires a large amount of PSFCH transmission resources. How to design a reasonable frame structure for PSFCH transmission using a plurality of consecutive time slots to more effectively improve transmission efficiency is also a problem to be solved.

Figure 6:
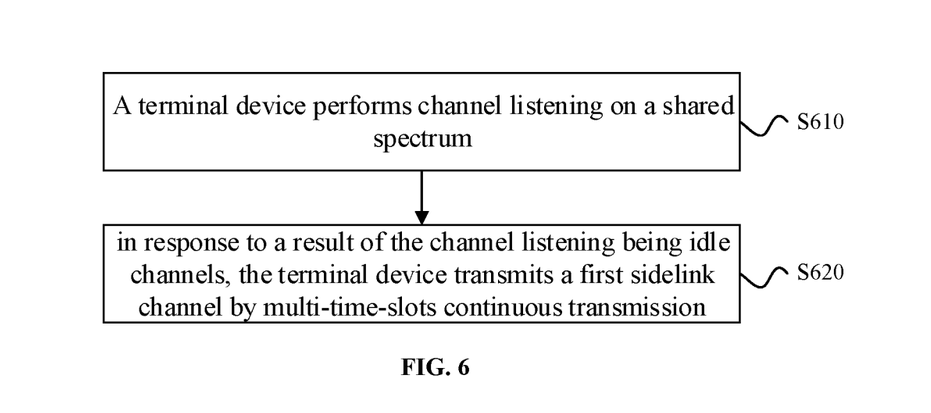
FIG. 6 is a flow chart of another method for sidelink communication according to some embodiments of the present disclosure.

To this end, some embodiments of the present disclosure provide another method for sidelink communication. In the method, the terminal device transmits a first sidelink channel by consecutive-slots transmission, and one or more PSFCH may be allocated to the transmission block carried by the first sidelink channel. Moreover, in a plurality of time slots, PSFCH feedback can be flexibly transmitted based on the setting of PSFCH, thereby improving transmission efficiency. The following is a detailed description of the method for sidelink communication in conjunction with FIG. 6. The method shown in FIG. 6 is related to FIG. 5. Therefore, for simplicity, FIG. 6 no longer provides a detailed explanation of the terms that have already appeared in FIG. 5.

Referring to FIG. 6, at S610, a terminal device performs channel listening on a shared spectrum.

The channel listening may refer to that the terminal device performs listening on a plurality of channel resources in the shared spectrum, or that the terminal device performs listening on a target channel resource.

The channel resources may be resources in the shared spectrum, or COT resources shared by other terminal devices in the sidelink. For example, in V2X, terminal devices may perform channel listening on COT shares provided by nearby vehicles.

In some embodiments, channel listening may refer to that the terminal device performs listening on channel resources using LBT mechanism, or that the terminal device performs listening using channel awareness or the like. For example, the terminal device may determine the occupancy of sidelink resources based on the RSRP value of the DMRS of the sidelink.

The result of channel listening may be either that the listened channel resources are idle or that the listened channels are occupied. When the result of channel listening is that the channels are occupied, the channel listening is failed. The terminal device may continue to perform channel listening until an idle channel is found.

At S620, in response to a result of the channel listening being idle channels, the terminal device transmits a first sidelink channel by consecutive-slots transmission.

The consecutive-slots transmission may be implemented by aggregating a plurality of time slots, to improve transmission efficiency and reduce LBT access processes. By aggregating a plurality of consecutive time slots, a larger transmission block, namely the first transmission block, may be formed.

The first transmission block may include transmission data corresponding to the plurality of consecutive time slots. Compared with the transmission block corresponding to each transmission time slot, the size of the first transmission block is relatively large, which can provide relatively large coding gain.

The consecutive-slots transmission may perform scheduling under different resource allocation modes. For example, in resource allocation mode 1, a plurality of consecutive time slots may be scheduled using PDCCH, and a plurality of subsequent time slots that are adjacent or non-adjacent to each other may be scheduled using PDCCH of the first time slot. For example, in resource allocation mode 2, a plurality of consecutive time slots may be scheduled using SCI, and the parameters of SCI-1 or SCI-2 may be set in the first time slot and applied to subsequent time slots in transmission.

The plurality of consecutive time slots corresponding to the consecutive-slots transmission may be determined according to a plurality of factors. For example, the formation of the plurality of time slots may be determined based on the identical regions/destination ID in SCI. For example, the formation of the plurality of time slots may be determined based on adjacent time slots. For example, the formation of the plurality of time slots may be determined based on the transmission mode of groupcast or unicast.

The first sidelink channel may include at least one of PSCCH, PSSCH or PSFCH. In consecutive-slots transmission, the first sidelink channel may include one or more PSFCHs. For example, the SCI parameter may be set so that each time slot has a PSFCH, or that a plurality of consecutive time slots have one PSFCH.

In some embodiments, the first sidelink channel may include one PSFCH, i.e. the first PSFCH. For the plurality of consecutive time slots having one PSFCH, one or more symbols of one time slot may be selected to send the first PSFCH. For example, the last symbol of the last time slot of the plurality of consecutive time slots is defined as the first symbol, and the time-domain resources for the first PSFCH may include one symbol adjacent to the first symbol. That is to say, the time-domain resources for the first PSFCH may be the penultimate sidelink symbol of the last time slot, or may be two consecutive symbols including the penultimate sidelink symbol.

In some embodiments, the first sidelink channel including one piece of PSFCH may further include one piece of SCI. SCI may include SCI-1 and SCI-2, or include SCI-1 or SCI-2. For example, the first sidelink channel may include one piece of SCI-2, and the time-domain resource including SCI-2 is in the first time slot of the plurality of consecutive time slots. Taking three consecutive time slots as an example, when the three time slots are time slot n, time slot n+1, and time slot n+2, the time-domain resource including SCI-2 may include the first few symbols of the time slot n except for AGC, and the time slots n+1 and n+2 are mainly used for transmitting PSSCH and PSFCH.

In some embodiments, the time-domain resource including SCI may correspond to the first time slot of the plurality of consecutive time slots. By setting SCI in the first time slot, the parameters/fields in SCI are applicable to all subsequent time slots during transmission. For example, SCI-2 in the first time slot may be used to demodulate the transmission data of the first time slot and of a plurality of subsequent time slots.

In some embodiments, when the first transmission block is configured with one PSFCH, the result of decoding by the terminal device may be determined to be NACK or ACK based on the first transmission block.

In some embodiments, the first sidelink channel may include a plurality of PSFCHs, such that there are a plurality of pieces of PSFCH feedback in the first transmission block. The plurality of PSFCHs may include a second PSFCH and at least one other PSFCH. The at least one other PSFCH may be one PSFCH or a plurality of PSFCHs. Accordingly, the plurality of consecutive time slots may include a last time slot and at least one other time slot. The at least one other PSFCH may be in one-by-one correspondence to the at least one other time slot. Therefore, the at least one other time slot may be one time slot or a plurality of time slots.

For the plurality of consecutive time slots configured with a plurality of PSFCHs, a plurality of symbols should be selected to transmit the plurality of PSFCHs. In some embodiments, the symbols in the plurality of consecutive time slots are classified, where a last symbol of the last time slot is referred to as a second symbol, a last symbol of the at least one other time slot is referred to as a third symbol.

In some embodiments, the time-domain resources for the second PSFCH may be consistent with the first PSFCH as mentioned above, and will not be repeated here. The time-domain resources for the at least one other PSFCH may include the third symbol. In other words, each time-domain resource of the time-domain resources for the at least one other PSFCH may be the last symbol of a respective time slot of the at least one other time slot. Taking still three consecutive time slots as an example, Three PSFCHs that are in one-by-one correspondence to the three time slots may be configured. These three PSFCHs may include one second PSFCH and two other PSFCHs. When these three time slots are time slot n, time slot n+1, and time slot n+2, the second PSFCH may be set on the penultimate symbol of the time slot n+2, and the two other PSFCHs may be set on the last symbols of the time slot n and the time slot n+1, respectively.

In some embodiments, the first sidelink channel configured with a plurality of PSFCHs may further include a plurality of pieces of SCI-2. Each piece of SCI-2 of the plurality of pieces of SCI-2 may correspond to a respective PSFCH of the plurality of PSFCHs, and each time-domain resource of time-domain resources for the plurality of pieces of SCI-2 may correspond to a respective time slot of the plurality of consecutive time slots. For example, each time slot of the three time slots mentioned above may correspond to a respective piece of SCI-2, and the time-domain resources for each piece of SCI-2 may be the first few symbols of each time slot except for AGC.

In some embodiments, the HARQ code for the plurality of PSFCHs may be considered separately based on each time slot, or a plurality of HARQs may form a single HARQ. For example, "AND" calculation may be performed on HARQ feedback from a plurality of time slots to form a HARQ.

In some embodiments, the at least one PSFCH carries feedback information associated with a first PSSCH. The first PSSCH may be associated with a plurality of PSFCH transmission resources on the shared spectrum, and the plurality of PSFCH transmission resources may be configured to transmit the at least one PSFCH mentioned above. FIG. 5 illustrates the association of the first PSSCH with a plurality of PSFCH transmission resources, and will not be repeated here.

In some embodiments, the terminal device may configure the transmission frame structure of PSFCH according to the modes of different services or quality control information (QCI). A frame structure that meets service requirements or QCI requirements can facilitate improvement of transmission efficiency.

It can be seen that, for the plurality of consecutive time slots transmitted each time in consecutive-slots transmission, ACK/NACK is fed back by HARQ through PSFCH. The plurality of consecutive time slots can flexibly provide PSFCH feedback according to service or other requirements and by setting of SCI.

Figure 7:
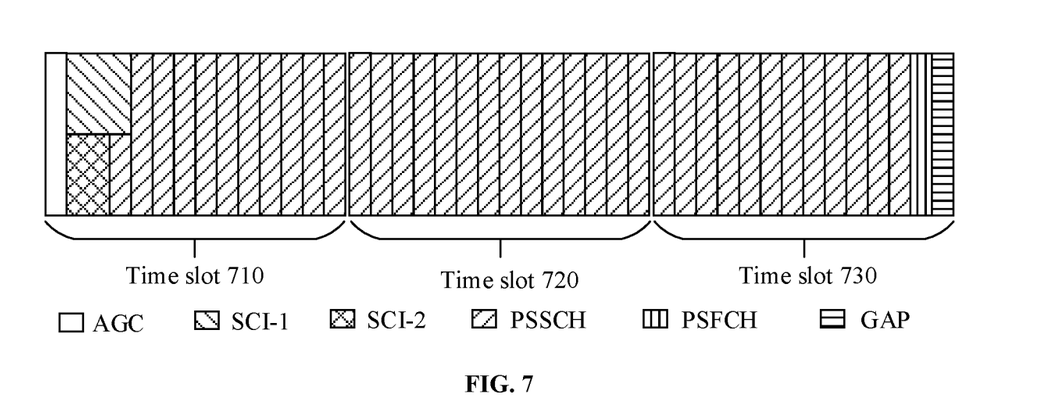
FIG. 7 is a schematic diagram of a possible frame structure for the plurality of consecutive time slots in the method as illustrate in FIG. 6.
Figure 8:
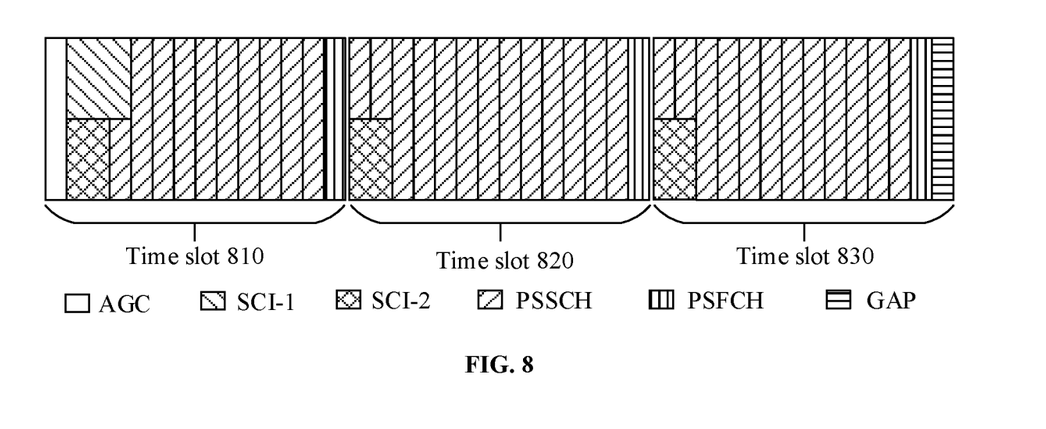
FIG. 8 is a schematic diagram of another possible frame structure for the plurality of consecutive time slots in the method as illustrate in FIG. 6.

For ease of understanding, taking the consecutive-slots transmission with 3 time slots as an example, the frame structure of the plurality of consecutive time slots will be briefly described in conjunction with FIGS. 7 and 8. FIG. 7 shows a schematic diagram of a frame structure for 3 time slots configured with one PSFCH. FIG. 8 shows a schematic diagram of a frame structure for 3 time slots configured with 3 PSFCH.

Referring to FIG. 7, time slots 710, 720, and 730 are three consecutive time slots which are aggregated into a time slot (not shown in the drawing). The first symbol in the time slot 710 is AGC. SCI-1 is configured on the second to fourth symbols of the time slot 710, and SCI-2 is configured on the second to third symbols of the time slot 710. PSFCH is configured on the penultimate symbol of the time slot 730. The last symbol of the time slot 730 is GAP. All other symbols of the aggregated time slot are configured to transmit PSSCH.

As shown in FIG. 7, in the first transmission block formed by three consecutive time slots, only one PSFCH is configured in the last time slot, and SCI-1 and SCI-2 are configured in the first time slot.

Referring to FIG. 8, the aggregated time slot (not shown in the drawing) is formed by three consecutive time slots, i.e. the time slot 810, the time slot 820 and the time slot 830.

Compared with FIG. 7, the main difference in FIG. 8 is the number and configuration of SCI-2 and PSFCH. As shown in FIG. 8, the frame structure as shown in FIG. 8 includes 3 PSFCHs and 3 pieces of SCI-2. The 3 pieces of SCI-2 are configured on the second and third symbols of the time slots 810, 820, and 830, respectively. Two PSFCHs of the three PSFCHs are configured on the last symbol of the time slots 810 and 820, respectively, and one PSFCH is configured on the penultimate symbol of the time slot 830.

The above illustrates, in conjunction with FIGS. 5 to 8, embodiments for the method according to the present disclosure in detail. Embodiments for the device according to the present disclosure will be illustrated in detail in the following, in conjunction with FIGS. 9 to 11. It should be understood that the illustration of the embodiments for device corresponds to the illustration of the embodiments for method. Therefore, the content which is not illustrated in detail may refer to the previous embodiments for method.

Figure 9:
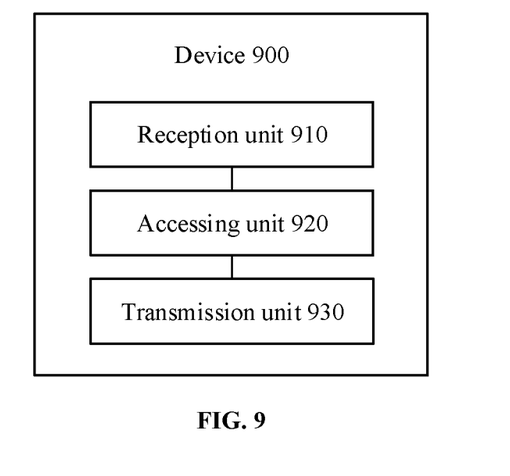
FIG. 9 is a structural diagram of a device for sidelink communication according to some embodiments of the present disclosure.

FIG. 9 is a schematic block diagram of a communication device according to some embodiments of the present disclosure. The device 900 may be any terminal device as illustrated above. The device 900 as shown in FIG. 9 includes a reception unit 910, an accessing unit 920, and a transmission unit 930.

The reception unit 910 may be configured to receive a first PSSCH.

The accessing unit 920 may be configured to perform channel access on a shared spectrum, where the first PSSCH is associated with a plurality of PSFCH transmission resources on the shared spectrum, and the plurality of PSFCH transmission resources are determined based on reserved resources, dynamic resources, or the reserved resources and the dynamic resources on the shared spectrum.

The transmission unit 930 may be configured to transmit a first PSFCH using one PSFCH transmission resource of the plurality of PSFCH transmission resources, where the first PSFCH carries feedback information associated with the first PSSCH.

In some embodiments, the plurality of PSFCH transmission resources are determined based on at least one of the reserved resources or the dynamic resources on the shared spectrum.

In some embodiments, the reserved resources are associated with first indication information, and the first indication information is determined based on at least one of: a maximum number of resource blocks required by each PSFCH transmission resource of the plurality of PSFCH transmission resources, a number of first sidelink time-domain units in the reserved resources, a number of resource blocks configured for PSFCH transmission in a first sidelink time-domain unit, a number of PSFCH transmission resources in a first sidelink time-domain unit, or a service type corresponding to the first PSSCH.

In some embodiments, the first indication information is carried in first sidelink control information.

In some embodiments, the reserved resources include M PSFCH transmission resources, and first indication information IndexTO corresponding to a j-th PSFCH transmission resource of the M PSFCH transmission resources meets:

$$IndexTO=j\times \lfloor n\times m/M_s \rfloor;$$

where j is an integer with a value range from 0 to M-1, n represents the number of the first sidelink time-domain units in the reserved resources, m represents the number of the resource blocks configured for PSFCH transmission in a first sidelink time-domain unit, and $M_s$ represents the number of PSFCH transmission resources in a first sidelink time-domain unit.

In some embodiments, the terminal device further includes a determination unit configured to determine whether there are idle PSFCH transmission resources in the reserved resources. The transmission unit is further configured to transmit the first PSFCH using the dynamic resources in response to there being no idle PSFCH transmission resources in the reserved resource.

In some embodiments, in response to the feedback information being a NACK, the first PSFCH is transmitted based on information of the NACK.

In some embodiments, the transmission unit is further configured to terminate transmission of the first PSFCH in response to a number of NACKs being greater than a first threshold.

In some embodiments, the terminal device further includes a listening unit configured to perform channel listening on the shared spectrum. The transmission unit is further configured to determine whether to transmit the first PSFCH using short control signaling based on a result of the channel listening.

In some embodiments, the transmission unit is further configured to transmit the first PSFCH using the short control signaling in response to a number of failures of the channel listening being greater than a second threshold.

Figure 10:
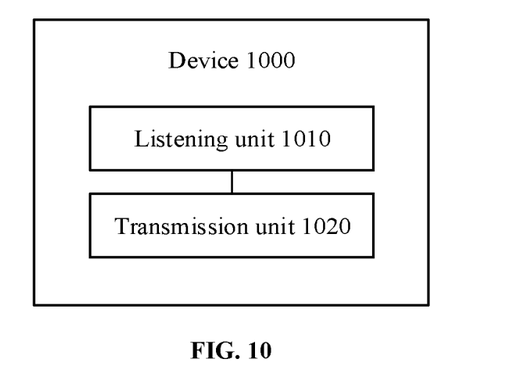
FIG. 10 is a structural diagram of another device for sidelink communication according to some embodiments of the present disclosure.

FIG. 10 is a schematic block diagram of another communication device according to some embodiments of the present disclosure. The device 1000 may be any terminal device as illustrated above. The device 1000 as shown in FIG. 10 includes a listening unit 1010 and a transmission unit 1020.

The listening unit 1010 may be configured to perform channel listening on a shared spectrum.

The transmission unit 1020 may be configured to transmit a first sidelink channel by consecutive-slots transmission in response to a result of the channel listening being idle channels. The consecutive-slots transmission corresponds to a plurality of consecutive time slots, a first transmission block carried by the first sidelink channel includes transmission data corresponding to the plurality of consecutive time slots, and the first sidelink channel includes at least one PSFCH.

In some embodiments, the first sidelink channel includes one PSFCH referring to as a first PSFCH, a last symbol of a last time slot of the plurality of consecutive time slots is referred to as a first symbol, and time-domain resources for the first PSFCH include one symbol adjacent to the first symbol.

In some embodiments, the first sidelink channel further includes one piece of second-stage SCI, where time-domain resources for the piece of second-stage SCI are in a first time slot of the plurality of consecutive time slots.

In some embodiments, the first sidelink channel includes a plurality of PSFCHs including a second PSFCH and at least one other PSFCH, and the plurality of consecutive time slots include a last time slot and at least one other time slot. A last symbol of the last time slot is referred to as a second symbol, a last symbol of the at least one other time slot is referred to as a third symbol. Time-domain resources for the second PSFCH include one symbol adjacent to the second symbol, and time-domain resources for the at least one other PSFCH include the third symbol.

In some embodiments, the first sidelink channel further includes a plurality of pieces of second-stage SCI. Each time-domain resource of time-domain resources for the plurality of pieces of second-stage SCI corresponds to a respective time slot of the plurality of consecutive time slots.

In some embodiments, the at least one PSFCH carries feedback information associated with a first PSSCH. The first PSSCH is associated with a plurality of PSFCH transmission resources on the shared spectrum, and the plurality of PSFCH transmission resources are configured to transmit the at least one PSFCH.

Figure 11:
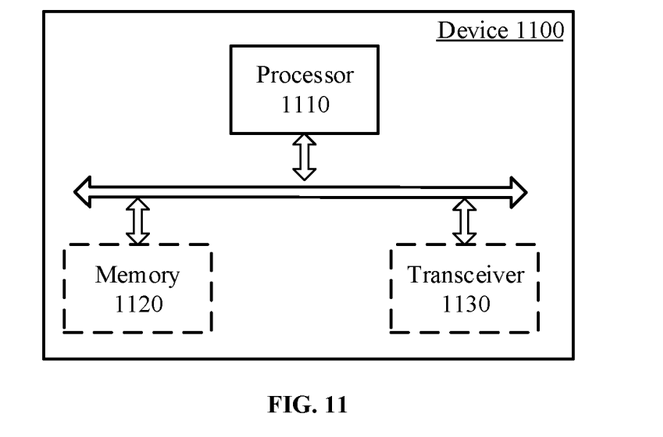
FIG. 11 is a structural diagram of a communication device according to some embodiments of the present disclosure.

FIG. 11 is a schematic structural diagram of a communication device according to some embodiments of the present disclosure. The dashed lines in FIG. 11 indicate that the unit or module is optional. The device 1100 may be used to implement the method illustrated in the above embodiments for method. The device 1100 may be a chip or a terminal device.

The device 1100 may include at least one processor 1110. The processor 1110 may support the device 1100 to implement the method illustrated in the above embodiments for method. The processor 1110 may be a general-purpose processor or a dedicated processor. For example, the processor may be a central processing unit (CPU). Alternatively, the processor may be other general-purpose processor, a digital signal processor (DSP), an application specific integrated circuits (ASIC), a field programmable gate arrays (FPGA), or other programmable logic device, a discrete gate or transistor logic device, a discrete hardware component or the like. A general-purpose processor may be a microprocessor or any conventional processor.

The device 1100 may further include at least one memory 1120. The memory 1120 is configured to store programs, which, when executed by the processor 1110, cause the processor 1110 to implement operations of the method illustrated in the above embodiments for method. The memory 1120 may be independent of the processor 1110 or be integrated in the processor 1110.

The device 1100 may further include a transceiver 1130. The processor 1110 may communicate with other devices or chips through the transceiver 1130. For example, the processor 1110 may transmit and receive data with other devices or chips through the transceiver 1130.

Some embodiments of the present disclosure provide a non-transitory computer readable storage medium, configured to store programs. The non-transitory computer readable storage medium is applicable to the terminal device provided by the embodiments of the present disclosure or network devices. When the programs are executed, cause a computer to implement operations of the method implemented by the terminal device or network devices according to the embodiments of the present disclosure.

It should be understood that the non-transitory computer-readable storage medium provided in the embodiments of present disclosure may be any computer-readable and available medium, or a data storage device such as a server or data center that includes one or more available media integrations. The available medium may be a magnetic medium (such as floppy disks, hard drives, magnetic tapes), an optical medium (such as digital video discs (DVDs)), a semiconductor medium (such as solid state disks (SSDs)) or the like.

Some embodiments of the present disclosure provide a computer program product including programs. The computer program product is applicable to the terminal device provided by the embodiments of the present disclosure or network devices. When the programs are executed, cause a computer to implement operations of the method implemented by the terminal device or network devices according to the embodiments of the present disclosure.

The above embodiments may be fully or partially implemented through software, hardware, firmware, or any combination thereof. When implemented using software, the above embodiments may be fully or partially implemented in the form of computer program products. The computer program product includes one or more computer instructions. When loading and executing the computer program instructions on a computer, all or part of the processes or functions described in the embodiments of the present disclosure are implemented. The computer may be a general-purpose computer, a dedicated computer, a computer network, or other programmable devices. The computer instructions may be stored in a computer-readable storage medium or transmitted from one computer-readable storage medium to another, for example, the computer instructions may be transmitted from a website, a computer, a server or a data center to another website site, computer, server, or data center in a wired (such as coaxial cable, fiber optic, digital subscriber line (DSL)) or wireless (such as infrared, wireless, microwave, etc.) way.

Some embodiments of the present disclosure provide a computer program. The computer program is applicable to the terminal device provided by the embodiments of the present disclosure or network devices. When the computer program is executed, cause a computer to implement operations of the method implemented by the terminal device or network devices according to the embodiments of the present disclosure.

The terms "system" and "network" in the present disclosure may be interchangeably used. In addition, the terms used in the present disclosure are only intended to illustrate the specific embodiments of the present disclosure, and are not intended to limit the present disclosure. The terms "first", "second", "third" and "fourth" in the description, claims, and accompanying drawings of the present disclosure are used to distinguish different objects, rather than to describe a specific order. In addition, the terms "including" and "having", as well as any variations of them, are intended to cover non-exclusive inclusions.

In the embodiments of the present disclosure, the "indication" mentioned may be a direct indication, an indirect indication, or a representation of a related relationship. For example, A indicates B, which may indicate that A directly indicates B, for example, B may be obtained through A; or that A indirectly indicates B, for example, A indicates C, and B may be obtained through C; or that there is an association between A and B.

In the embodiments of the present disclosure, the term "corresponding to" may indicate a direct or indirect correspondence between two objects, a correlation between two objects, or relationships of indicating and being indicated, or configuring and being configured.

In the embodiments of the present disclosure, "pre-configuration" may be implemented by pre-saving corresponding codes, tables, or other methods that can be used to indicate relevant information in devices (such as terminal devices and network devices). The present disclosure does not limit the specific implementation.

In the embodiments of the present disclosure, "protocol" may refer to standard protocols in the field of communication, such as LTE protocol, NR protocol, and related protocols applied in future communication systems. The present disclosure does not limit this.

In the embodiments of the present disclosure, determining B based on A does not mean solely determining B based on A, B may also be determined based on A and/or other information.

In the embodiments of the present disclosure, the term "and/or" is simply a description of the association relationship between associated objects, indicating that there may be three types of relationships. For example, A and/or B may represent the three situations of only A, A and B, and only B. In addition, the character "I" in the present disclosure generally indicates that the associated objects have an "or" relationship.

In the embodiments of the present disclosure, the sequence numbers of the above processes do not imply the order of execution. The execution order of the processes should be determined based on their functions and internal logics, and should not constitute any limitations on the implementation process of the embodiments of the present disclosure.

In the embodiments of the present disclosure, it should be understood that the disclosed systems, devices, and methods may be implemented in other ways. For example, the embodiments for device described above are only exemplary. For example, the division of the units is only a logical functional division, and there may be other division manners in actual implementation. For example, a plurality of units or components may be combined or integrated into another system, or some features may be ignored or not executed. On the other hand, the shown or discussed coupling or direct coupling or communication connection between each other may be indirect coupling or communication connection through some interfaces, devices or units, which may be in electrical, mechanical or other forms.

The units described as separate components may be or may not be physically separated, and the components shown as units may be or may not be physical units, that is, they may be located in one place or distributed across multiple network units. Some or all of the units may be selected according to actual needs to achieve the purpose of the present disclosure.

In addition, each functional unit in each embodiment of the present disclosure may be integrated in one processing unit, or each unit may exist physically independently, or two or more units may be integrated in one unit.

The above is only the specific implementations of the present disclosure, but the scope of protection of the present disclosure is not limited to this. Any change or replacement that is easily conceivable to those skilled in the art within the scope of technology disclosed in the present disclosure should be covered by the scope of protection of the present disclosure. Therefore, the scope of protection of the present disclosure should be based on the claimed scope of protection.

What is claimed is:

1. A method for sidelink communication, comprising:
performing, by a terminal device, channel listening on a shared spectrum; and
in response to a result of the channel listening being idle channels, transmitting, by the terminal device, a signal over a first sidelink channel by using a consecutive-slots transmission;
wherein the consecutive-slots transmission comprises a transmission over a plurality of consecutive time slots, a first transmission block carried by the first sidelink channel includes transmission data corresponding to the plurality of consecutive time slots, wherein the first sidelink channel includes a second physical sidelink feedback channel (PSFCH), and the plurality of consecutive time slots include a last time slot, wherein time-domain resources for the second PSFCH include one symbol adjacent to a second symbol, wherein the second symbol is a last symbol of the last time slot.

2. The method according to claim 1, wherein the first sidelink channel includes one piece of second-stage sidelink control information (SCI), wherein time-domain resources for the one piece of second-stage SCI are in a first time slot of the plurality of consecutive time slots.

3. The method according to claim 1, wherein the first sidelink channel includes at least one other PSFCH, and the plurality of consecutive time slots include a last time slot and at least one other time slot, wherein time-domain resources for the at least one other PSFCH include a third symbol, wherein the third symbol is a last symbol of the at least one other time slot.

4. The method according to claim 1, wherein the first sidelink channel includes a plurality of pieces of second-stage sidelink control information (SCI), wherein each time-domain resource of time-domain resources for the plurality of pieces of second-stage SCI corresponds to a respective time slot of the plurality of consecutive time slots.

5. The method according to claim 1, wherein the first sidelink channel includes at least one PSFCH, the at least one PSFCH carries feedback information associated with a first physical sidelink shared channel (PSSCH), the first PSSCH is associated with a plurality of PSFCH transmission resources on the shared spectrum, and the plurality of PSFCH transmission resources are configured to transmit the at least one PSFCH.

6. An apparatus, comprising:
at least one processor;
one or more non-transitory computer-readable storage media coupled to the at least one processor and storing programming instructions for execution by the at least one processor, wherein the programming instructions, when executed, cause the apparatus to perform operations comprising:
performing channel listening on a shared spectrum; and
in response to a result of the channel listening being idle channels, transmitting a signal over a first sidelink channel by using a consecutive-slots transmission;
wherein the consecutive-slots transmission comprises a transmission over a plurality of consecutive time slots, a first transmission block carried by the first sidelink channel includes transmission data corresponding to the plurality of consecutive time slots, wherein the first sidelink channel includes a second physical sidelink feedback channel (PSFCH), and the plurality of consecutive time slots include a last time slot, wherein time-domain resources for the second PSFCH include one symbol adjacent to a second symbol, wherein the second symbol is a last symbol of the last time slot.

7. The apparatus according to claim 6, wherein the first sidelink channel includes one piece of second-stage sidelink control information (SCI), wherein time-domain resources for the one piece of second-stage SCI are in a first time slot of the plurality of consecutive time slots.

8. The apparatus according to claim 6, wherein the first sidelink channel includes at least one other PSFCH, and the plurality of consecutive time slots include at least one other time slot, wherein time-domain resources for the at least one other PSFCH include a third symbol, wherein the third symbol is a last symbol of the at least one other time slot.

9. The apparatus according to claim 6, wherein the first sidelink channel includes a plurality of pieces of second-stage sidelink control information (SCI), wherein each time-domain resource of time-domain resources for the plurality of pieces of second-stage SCI corresponds to a respective time slot of the plurality of consecutive time slots.

10. The apparatus according to claim 6, wherein the first sidelink channel includes at least one PSFCH, the at least one PSFCH carries feedback information associated with a first physical sidelink shared channel (PSSCH), the first PSSCH is associated with a plurality of PSFCH transmission resources on the shared spectrum, and the plurality of PSFCH transmission resources are configured to transmit the at least one PSFCH.

11. One or more non-transitory computer-readable media storing computer instructions, that when executed by one or more processors, cause a computing device to perform operations comprising:
performing channel listening on a shared spectrum; and
in response to a result of the channel listening being idle channels, transmitting a signal over a first sidelink channel by using a consecutive-slots transmission;
wherein the consecutive-slots transmission comprises a transmission over a plurality of consecutive time slots, a first transmission block carried by the first sidelink channel includes transmission data corresponding to the plurality of consecutive time slots, wherein the first sidelink channel includes a second physical sidelink feedback channel (PSFCH), and the plurality of consecutive time slots include a last time slot, wherein time-domain resources for the second PSFCH include one symbol adjacent to a second symbol, wherein the second symbol is a last symbol of the last time slot.

12. The one or more non-transitory computer-readable media according to claim 4, wherein the first sidelink channel includes one piece of second-stage sidelink control information (SCI), wherein time-domain resources for the one piece of second-stage SCI are in a first time slot of the plurality of consecutive time slots.

13. The one or more non-transitory computer-readable media according to claim 11, wherein the first sidelink channel includes a at least one other PSFCH, and the plurality of consecutive time slots include at least one other time slot, wherein time-domain resources for the at least one other PSFCH include a third symbol, wherein the third symbol is a last symbol of the at least one other time slot.

14. The one or more non-transitory computer-readable media according to claim 11, wherein the first sidelink channel includes a plurality of pieces of second-stage sidelink control information (SCI), wherein each time-domain resource of time-domain resources for the plurality of pieces of second-stage SCI corresponds to a respective time slot of the plurality of consecutive time slots.

* * * * *